(12) United States Patent
Mizoguchi et al.

(10) Patent No.: US 11,143,283 B2
(45) Date of Patent: Oct. 12, 2021

(54) STRAIN WAVE GEARING

(71) Applicant: HARMONIC DRIVE SYSTEMS INC., Tokyo (JP)

(72) Inventors: Yoshitomo Mizoguchi, Azumino (JP); Yuya Murayama, Azumino (JP); Shizuka Yata, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 244 days.

(21) Appl. No.: 16/473,820

(22) PCT Filed: Jan. 21, 2017

(86) PCT No.: PCT/JP2017/002038
§ 371 (c)(1),
(2) Date: Jun. 26, 2019

(87) PCT Pub. No.: WO2018/134986
PCT Pub. Date: Jul. 26, 2018

(65) Prior Publication Data
US 2021/0131543 A1 May 6, 2021

(51) Int. Cl.
*F16H 49/00* (2006.01)
(52) U.S. Cl.
CPC ..... *F16H 49/001* (2013.01); *F16H 2049/003* (2013.01)
(58) Field of Classification Search
CPC .................................................. F16H 49/001
(Continued)

(56) References Cited

U.S. PATENT DOCUMENTS 4,601,216 A * 7/1986 Inoue .................... F16H 49/001
74/640
4,969,376 A * 11/1990 Fickelscher ........... F16H 49/001
475/180

(Continued)

FOREIGN PATENT DOCUMENTS

JP 62096148 U 6/1987
JP 1108441 A 4/1989
(Continued)

OTHER PUBLICATIONS

International Search Report (PCT/ISA/210) and translation and Written Opinion (PCT/ISA/237) dated Apr. 18, 2017, by the Japanese Patent Office as the International Searching Authority for International Application No. PCT/JP2017/002038.

*Primary Examiner* — Ha Dinh Ho
(74) *Attorney, Agent, or Firm* — Buchanan Ingersoll & Rooney PC

(57) ABSTRACT

A strain wave gearing has a wave generator which flexes an externally toothed gear in a radial direction to form meshing portions thereof with an internally toothed gear in positions that are separated along a circumferential direction of the externally toothed gear. When the wave generator rotates, the meshing portions move in the circumferential direction. Non-meshing regions are formed in part of the meshing portions along the tooth trace direction thereof. The non-meshing regions are those of a prescribed width including the support center of a wave bearing in the tooth trace direction. The concentration of stress in the tooth root of the externally toothed gear can be alleviated, and the tooth-root fatigue strength of the externally toothed gear can be increased.

6 Claims, 7 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 4,974,470 | A * | 12/1990 | Ishikawa | F16H 49/001 |
| | | | | 74/640 |
| 5,016,491 | A * | 5/1991 | Poro | F16H 49/001 |
| | | | | 74/640 |
| 7,673,598 | B2 * | 3/2010 | Schaefer | F01L 1/352 |
| | | | | 123/90.15 |
| 7,836,786 | B2 * | 11/2010 | Zhang | F16H 49/001 |
| | | | | 74/461 |
| 7,854,995 | B1 * | 12/2010 | Anderson | B21K 1/305 |
| | | | | 428/546 |
| 8,485,064 | B2 * | 7/2013 | Kanai | F16H 49/001 |
| | | | | 74/640 |
| 2008/0173130 | A1 * | 7/2008 | Zhang | F16H 49/001 |
| | | | | 74/640 |

FOREIGN PATENT DOCUMENTS

| | | | |
|---|---|---|---|
| JP | 2010190373 A | 9/2010 |
| JP | 2016196895 A | 11/2016 |

* cited by examiner (A)

(B)

(A)

(B)

(A)

(B)

STRAIN WAVE GEARING

TECHNICAL FIELD

The present invention relates to a strain wave gearing. In particular, the present invention pertains to a strain wave gearing to mitigate stress concentration on the tooth root of a flexible externally toothed gear so that tooth-root fatigue strength of the externally toothed gear is increased.

BACKGROUND ART

In a strain wave gearing, torque is transmitted through meshing portions between a flexible externally toothed gear (flex spline) and a rigid internally toothed gear (circular spline), the externally toothed gear being flexed repeatedly in the radial direction. As an externally toothed gear, a cup-shaped, a silk-hat-shaped, and cylindrical shaped ones are known. In either case, the performance of a strain wave gearing can be improved when a flexible externally toothed gear is increased in the tooth-root fatigue strength thereof. For example, it is proposed in Patent document 1 that the support rigidity of an externally toothed gear by a wave generator is increased to make the tooth-face load distribution uniform in the tooth trace direction, so that the tooth-root fatigue strength of an externally toothed gear is increased. Patent document 2 proposes that the rim thickness of the tooth root of an externally toothed gear is appropriately set in accordance with the amount of flexion thereof, so that the tooth-root fatigue strength is increased to provide a strain wave gearing with higher strength.

PRIOR ART DOCUMENT

Patent document 1: JP 2016-196895 A
Patent document 2: JP 2010-190373 A

SUMMARY OF THE INVENTION

Problems to be Solved by the Invention

The tooth root of an externally toothed gear is applied with a stress due to meshing with an internally toothed gear and with a bending stress due to flexing into an elliptical or other non-circular shape.

Focusing on an external tooth of the externally toothed gear, the external tooth is applied with radial forces. The forces include one that generates according to the pressure angle thereof during meshing of teeth and one that acts from the radially inner side by the wave bearing of a wave generator so as to maintain the externally toothed gear to be in an elliptical shape.

It is an object of the present invention to provide a strain wave gearing, in which stress concentration occurred in the tooth root of an externally toothed gear can be mitigated in order for the tooth-root fatigue strength of the externally toothed gear to be increased.

Means of Solving the Problems

A strain wave gearing according to the present invention has:
 a rigid internally toothed gear;
 a flexible externally toothed gear;
 a wave generator that flexes the externally toothed gear in a radial direction to form a meshing portion with the internally toothed gear in positions that are separated along a circumferential direction thereof and moves the meshing portion in the circumferential direction; and
 a non-meshing region that is formed in part of the meshing portion with the internally toothed gear along a tooth trace direction of the externally toothed gear,
 wherein the internally toothed gear and the externally toothed gear are either spur gears or helical gears, the helical gears having a single tooth trace;
 the wave generator is provided with a wave bearing to support the externally toothed gear from a radially inner side direction; and
 the non-meshing region is a region that has a predetermined width and includes a support center of the wave bearing to support the externally toothed gear.

The non-meshing region is formed in the center portion along the tooth trace direction of the meshing portion of the externally toothed gear with the internally toothed gear, the center portion including the support center of the wave bearing. A radial force, which is generated due to the meshing of teeth, does not act on the center portion in the tooth trace direction where a radial force acting thereon by the wave bearing becomes largest. It is therefore possible to mitigate stress concentration occurred in the center portion along the tooth trace direction of the tooth root of the external teeth, and the tooth-root fatigue strength of the externally toothed gear can be increased.

Specifically, internal teeth or external teeth are applied with relieving in the center portion thereof along the tooth trace direction, the center portion including the support center of the wave bearing. Instead, portions of the external teeth or internal teeth, which are positioned on the support center of the wave bearing, are removed therefrom over a predetermined width along the tooth trace direction to form portions where external teeth or internal teeth are not formed.

It is possible that the externally toothed gear is provided with a cylindrical portion having a constant thickness to form the center portion in the tooth trace direction where no external teeth are formed.

In this way, it is possible to further mitigate the stress concentration that occurs in the center portion of the tooth root in the tooth trace direction of the externally toothed gear.

As described above, in the strain wave gearing of the present invention, stress concentration occurred in the center portion of the tooth root in the tooth trace direction of the externally toothed gear is mitigated. Accordingly, the tooth-root fatigue strength of the externally toothed gear can be increased, whereby improving the performance of the strain wave gearing.

Figure 5:
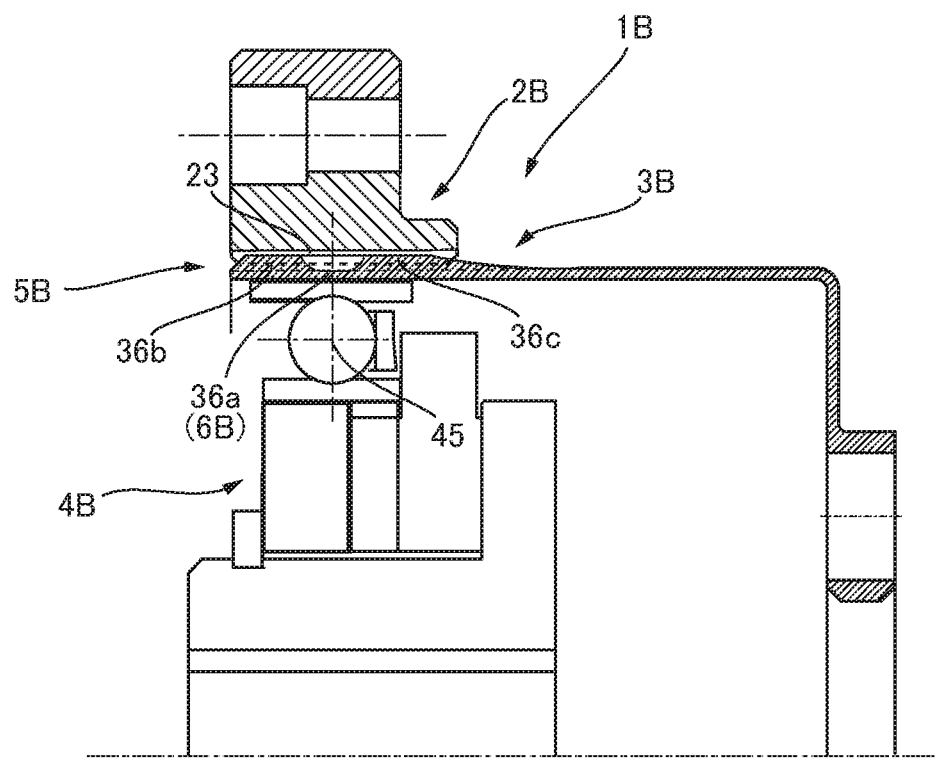
Figure 5:
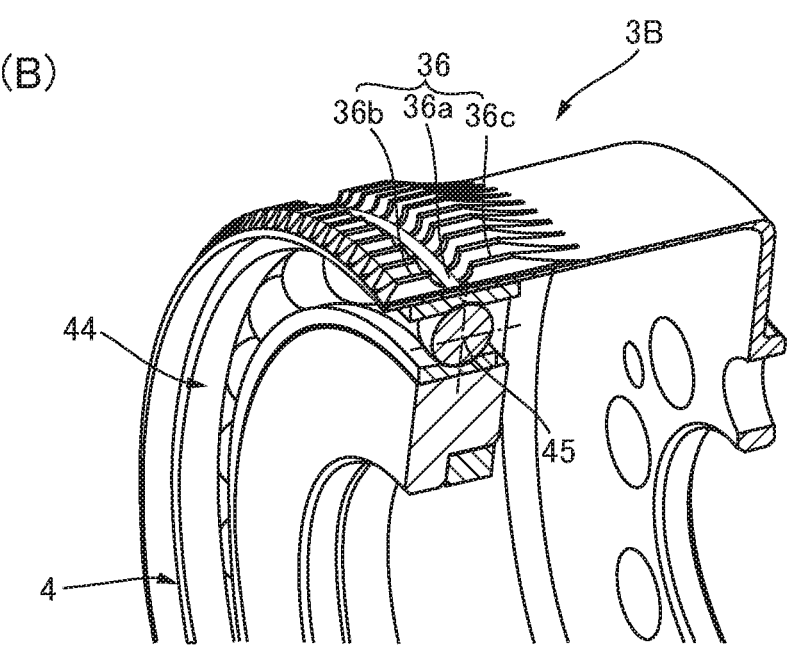
Figure 6:
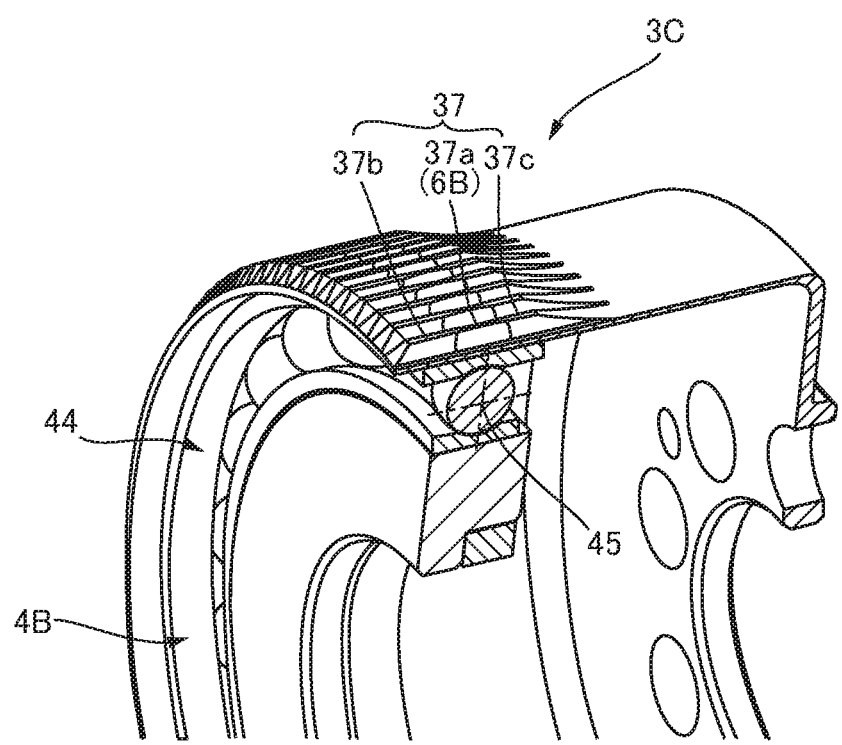
Figure 7:
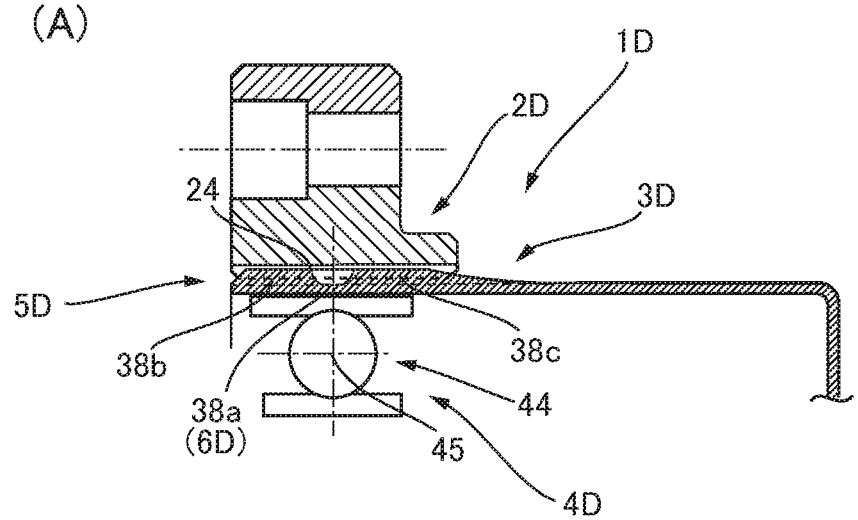
Figure 7:
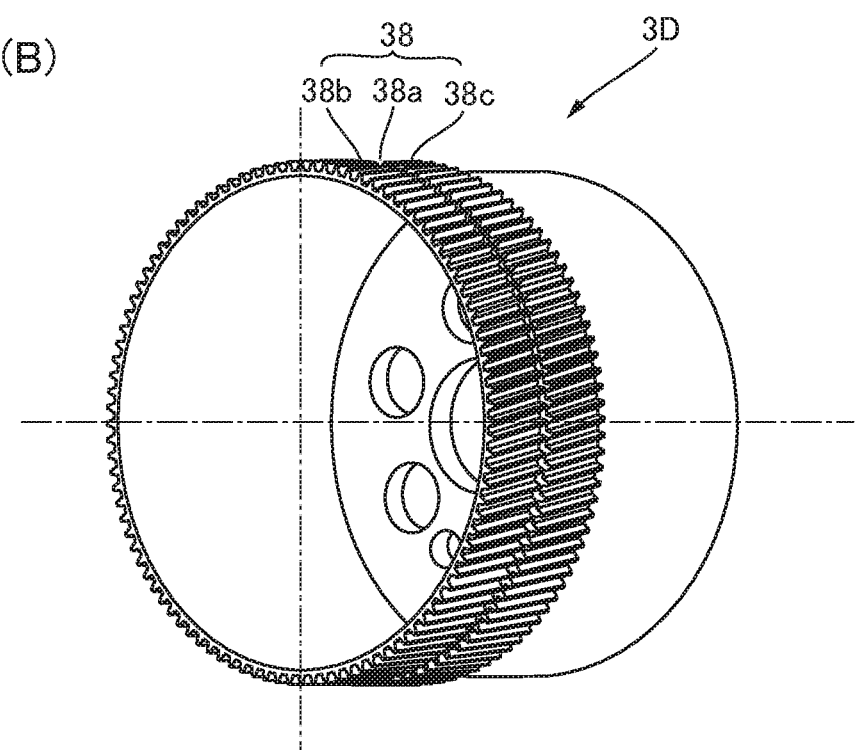

4(B) is an explanatory view illustrating a meshing potion between an externally toothed gear and an internally toothed gear;

FIG. 5(A) is a half longitudinal cross-sectional view illustrating an example of a cup-type strain wave gearing according to embodiment 2 of the present invention, and FIG. 5(B) is an explanatory view illustrating an example of the externally toothed gear thereof;

FIG. 6 is an explanatory view illustrating another example of the externally toothed gear of FIG. 5;

FIG. 7(A) is an explanatory view illustrating an example of a cup-type strain wave gearing according to embodiment 3 of the present invention, and FIG. 7(B) is an explanatory view illustrating an example of the externally toothed gear thereof.

MODE FOR CARRYING OUT THE INVENTION

With reference to the drawings, embodiments of a strain wave gearing to which the present invention is applied will be explained herein below.

Embodiment 1

FIG. 1(A) is a perspective view illustrating an example of a cup-type strain wave gearing according to the present invention, FIG. 1(B) is a longitudinal cross-sectional view thereof, and FIG. 1(C) is an end view thereof. A strain wave gearing 1 is provided with an annular rigid internally toothed gear 2, a cup-shaped externally toothed gear 3 mounted inside the internally toothed gear, and an elliptically contoured wave generator 4 fitted inside the externally toothed gear. The internally toothed gear 2 and the externally toothed gear 3 are spur gears that can be meshed with each other.

The externally toothed gear 3 is provided with a cylindrical body 31 capable of being flexed in a radial direction. A discoid diaphragm 32 extends toward a radially inner side from an end of the cylindrical body 31. An annular rigid boss 33 is integrally formed on the inner circumferential edge of the diaphragm 32. External teeth 34 are formed on the outer circumferential surface portion at the other end of the cylindrical body 31.

The wave generator 4 is provided with a cylindrical hub 41, an Oldham's coupling 42, a rigid plug 43 and a wave bearing 44. The hub 41 is linked and fixed in a coaxial manner to a motor shaft or other rotation input shaft (not shown). The rigid plug 43 is mounted on the outer circumferential surface of the hub 41 via the Oldham's coupling 42. The wave bearing 44 is mounted between an elliptical outer circumferential surface of the rigid plug 43 and an inner circumferential surface portion of the cylindrical body 31 of the externally toothed gear 3 where the external teeth are formed. The wave bearing 44 of the present example is a ball bearing provided with a flexible outer race and a flexible inner race.

The portion of the externally toothed gear 3 where the external teeth 34 are formed is flexed into an elliptical shape by the wave generator 4. This causes to form meshing portions 5 in the circumferential direction of the externally toothed gear 3 where a plurality of external teeth 34 located on and both sides of the major axis L1 of the elliptical shape mesh with internal teeth 21 of the internally toothed gear 2. When the wave generator 4 rotates, the meshing portions 5 between the both gears 2 and 3 move in the circumferential direction. In the case of this example, the difference in number of teeth between the both gears 2 and 3 is 2n (n is a positive integer). For example, a reduced-speed rotation is derived from the externally toothed gear 3 while the internally toothed gear 2 is fixed so as not to rotate.

Figure 2:
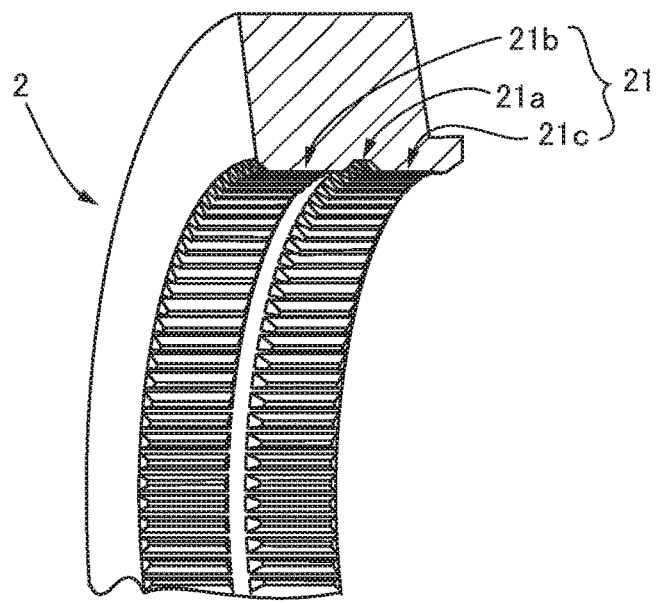
FIG. 2(A) is an explanatory view illustrating an internally toothed gear of FIG. 1.
FIG. 2(B) is an explanatory view illustrating a meshing portion between an externally toothed gear and an internally toothed gear.
Figure 2:
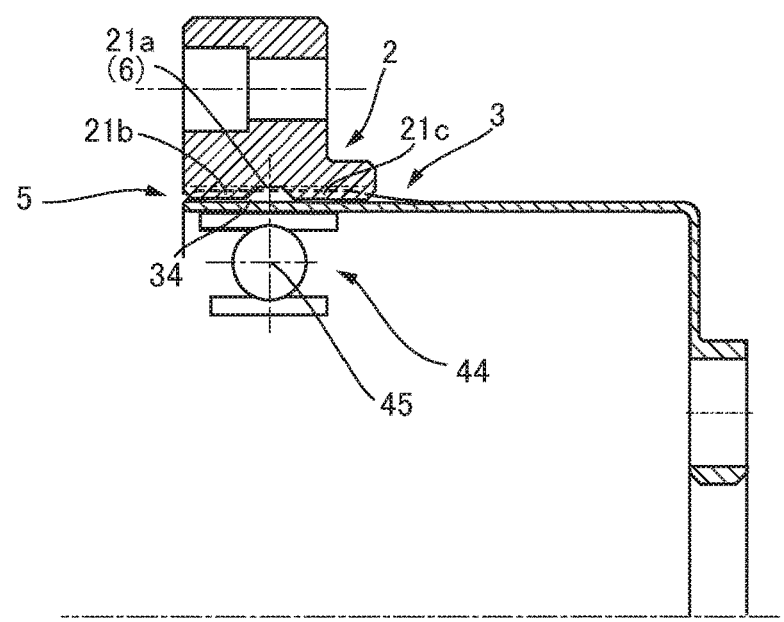

FIG. 2(A) is an explanatory view illustrating the internally toothed gear 2, and FIG. 2(B) is an explanatory view illustrating the meshing portion 5 between the internally toothed gear 2 and the externally toothed gear 3.

The internal teeth 21 of the internally toothed gear 2 are provided in the center portion in the tooth trace direction thereof with a groove portion 21a where no internal teeth are formed. The groove portion 21a extends in the circumferential direction, and internal tooth portions 21b and 21c are formed on both sides of the groove portion 21a at constant pitches along the circumferential direction. For example, the groove portion 21a where no internal teeth are formed has a groove bottom surface that is a circular inner circumferential surface, and the inner diameter of the groove bottom surface is the same as the root diameter of the internal tooth portions 21b and 21c on both sides. A portion from the internal tooth portion 21b to the groove portion 21a is defined by an inclined flat or curved surface so that the tooth depth of the internal tooth portion 21b is gradually decreased. A portion from the other internal tooth portion 21c to the groove portion 21a is also defined by an inclined flat or curved surface so that the tooth depth of the internal tooth portion 21c is gradually decreased.

The groove portion 21a is a region having a predetermined width and including the support center 45 of the wave bearing 44 in the tooth trace direction. The support center 45 is a ball center of the wave bearing 44. For example, the support center 45 is located at the center of the effective tooth width of the external teeth 34.

In the meshing portion 5, a non-meshing region 6 is formed in the center portion in the tooth trace direction of the external teeth 34 where no meshing with the internal teeth 21 is formed by the existence of the groove portion 21a as illustrated in FIG. 2(B). A radial force acts on the center portions in the tooth trace direction of the external teeth 34 from the side of the wave bearing 44. The center portions in the tooth trace direction of the external teeth 34 face the groove portion 21a in the internal teeth 21, so that a radial force due to meshing of the external teeth with the internal teeth 21 does not act on the center portions of the external teeth. The stress concentration, which occurs in the center portions in the tooth trace direction in the tooth root of the external tooth 34, is mitigated so that the tooth-root fatigue strength of the externally toothed gear 3 can be increased.

(Another Example of Internally Toothed Gear)

Figure 3:
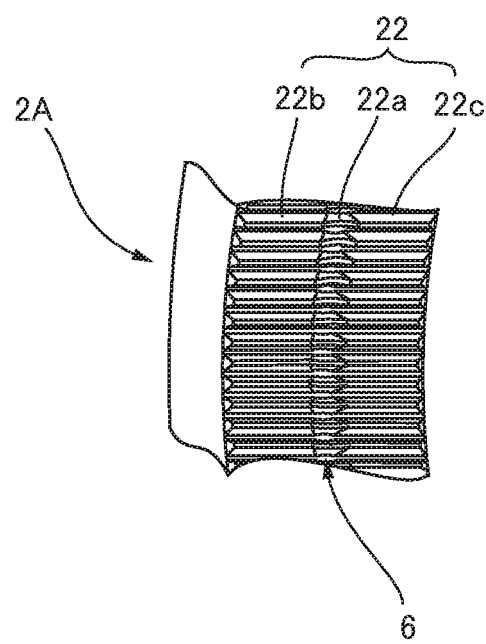
FIG. 3 is an explanatory view illustrating another example of an internally toothed gear of FIG. 1.

FIG. 3 is an explanatory view illustrating another example of the internally toothed gear 2. An internally toothed gear 2A has internal teeth 22 applied with relieving in the center portion in the tooth trace direction thereof. The relieving portion 22a of each of the internal teeth 22 is a portion where no meshing with the external teeth 34 is formed. On both sides of the relieving portion 22a in each of the internal teeth 22 are internal tooth portions 22b and 22c to mesh with the external teeth 34. In the relieving portion 22a, each of the internal teeth 22 is applied with relieving in a manner that the dimension in either tooth depth direction or tooth thickness direction of the internal teeth is decreased.

In the meshing portions 5 of the strain wave gearing 1 provided with the internally toothed gear 2A, the center portion in the tooth trace direction of each of the external teeth 34 faces each of the relieving portions 22a of the internal teeth 22. A non-meshing portion 6 is formed where no meshing with the internal teeth 22 is not formed. Similar to the case in which the internally toothed gear 2 is employed, it is possible to mitigate stress concentration occurred in the tooth root of the center portion in the tooth trace direction of each of the external teeth 34, and a tooth-root fatigue strength of the externally toothed gear 3 can be increased.

(Another Example of Externally Toothed Gear)

Figure 4:
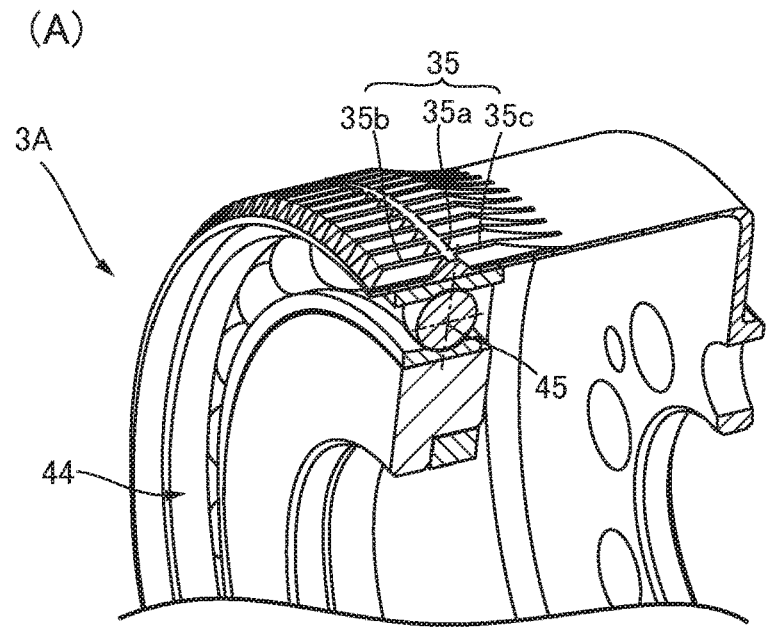
FIG. 4(A) is an explanatory view illustrating another example of an externally toothed gear of FIG. 1, and FIG.
Figure 4:
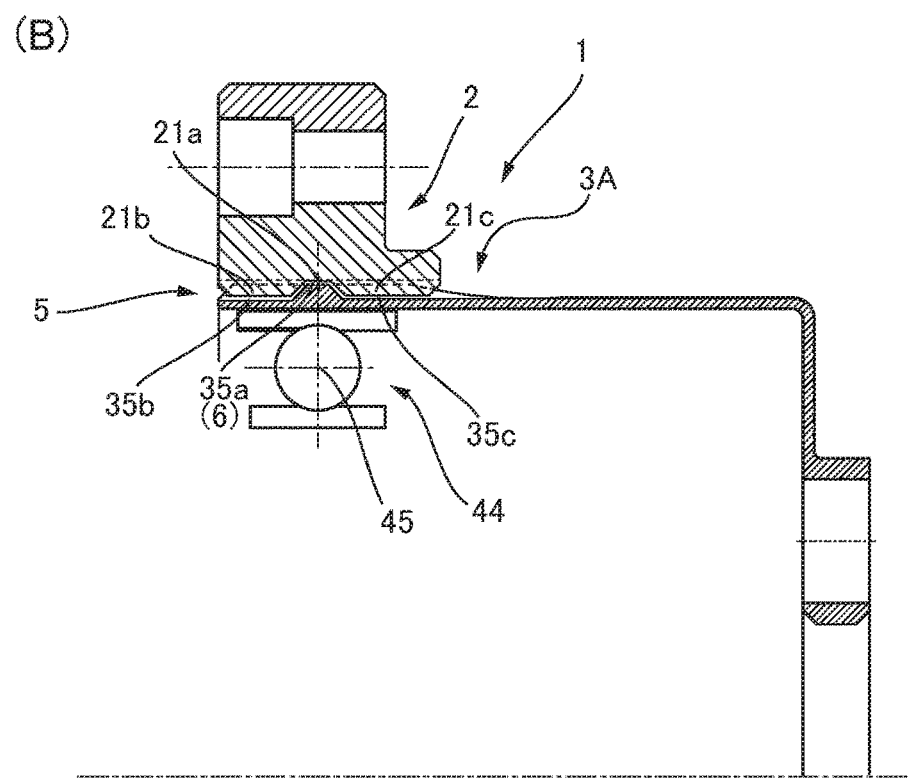

FIG. 4(A) is an explanatory view illustrating another example of the externally toothed gear 3, and FIG. 4(B) is an explanatory view illustrating a meshing portion between an externally toothed gear and an internally toothed gear. An externally toothed gear 3A illustrated in these drawings can be employed for the strain wave gearing 1 provided with the internally toothed gear 2 illustrated in FIGS. 1 and 2.

The externally toothed gear 3A has external teeth 35 provided with a rib 35a. The rib 35a is formed in portions of the external teeth 35 facing the groove portion 21a of the internal teeth 21 of the internally toothed gear 2, and the rib 35a has a trapezoidal-shaped cross-section and extends in the circumferential direction. On both sides of the rib 35a, are formed external tooth portions 35b and 35c which can be meshed with the internal tooth portions 21b and 21c of the internal teeth 21 of the internally toothed gear 2. The rib 35a has a thickness larger than the tooth-root rim thickness of the external tooth portions 35b and 35c. For example, the rib 35a has an outer diameter which is the same as the tip diameter of the external tooth portions 35b and 35c, and the rib is a portion where the thickness thereof remains as it is in a thick state without tooth space being formed.

The externally toothed gear 3A is formed with the thick rib 35a in the center portion in the tooth trace direction, the center portion corresponding to the support center 45 of the wave bearing 44. It is therefore possible to mitigate stress concentration occurred in the tooth root of the center portion in the tooth trace direction of the external teeth 35, which can improve tooth-root fatigue strength of the externally toothed gear 3A.

Embodiment 2

Figure 1:
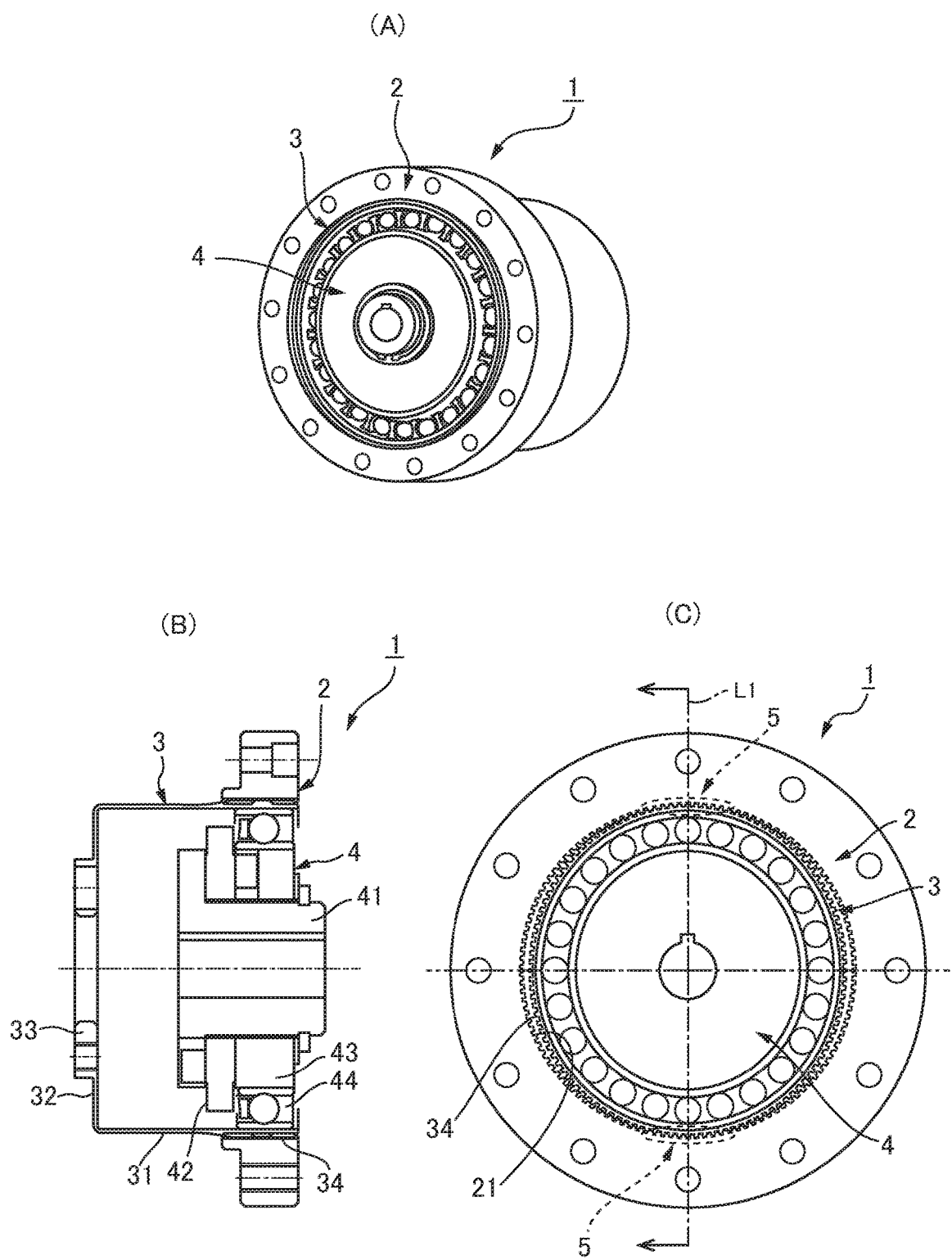
FIG. 1(A) is a perspective view illustrating an example of a cup-type strain wave gearing according to embodiment 1 of the present invention.
FIG. 1(B) is a longitudinal cross-sectional view thereof.
FIG. 1(C) is an end view thereof.

FIG. 5(A) is a half longitudinal cross-sectional view illustrating another example of a cup-type strain wave gearing according to the present invention, and FIG. 5(B) is an explanatory view illustrating a cup-shaped externally toothed gear. A strain wave gearing 1B has the same basic configuration as that of the cup-type strain wave gearing 1 as illustrated in FIG. 1. The strain wave gearing 1B of this example has an internally toothed gear 2B provided with internal teeth 23 that are continuous in the tooth trace direction thereof. A cup-shaped externally toothed gear 3B of the strain wave gearing is provided with external teeth 36 that are divided at the center portion in the tooth trace direction thereof. A wave generator 4B of the strain wave gearing has the same configuration as that of the above-mentioned wave generator 4.

Each of the external teeth 36 of the externally toothed gear 3B is provided with a groove portion 36a where no external tooth is formed, or where the external tooth is removed. On both sides in the tooth trace direction of the groove portion 36a, are formed external tooth portions 36b and 36c at constant pitches in the circumferential direction. The groove portion 36a is, for example, a cylindrical portion of a constant thickness. The groove portion 36a has a groove bottom surface defined by a circular outer circumferential surface, the outer diameter of which is the same as the root diameter of the external tooth portions 36b and 36c on both sides. A portion from the external tooth portion 36b to the groove bottom surface is defined by an inclined flat or curved surface, and therefore the tooth depth of the external tooth portion 36b is gradually decreased. A portion from the other external tooth portion 36c to the groove bottom surface is also defined by an inclined flat or curved surface, whereby the tooth depth of the external tooth portion 36c is gradually decreased.

The groove portion 36a where no external tooth is formed is a region having a predetermined width and including a support center 45 of the wave bearing 44 in the tooth trace direction. The support center 45 is the ball center of the wave bearing 44. The support center 45 is, for example, located at the center of the effective tooth width of the external teeth 36.

By the existence of the groove portion 36a of the external teeth 36, a non-meshing region 6B, in which no meshing of the external teeth with the internal teeth 23 is formed, is formed at the center portion in the tooth trace direction of a meshing portion 5B (which is a portion on the major axis of the elliptically-flexed externally toothed gear 3B). The non-meshing region 6B is a region having a predetermined width and including the support center 45 of the wave bearing 44 in the tooth trace direction. The stress concentration on the tooth root portion in the external teeth 36 corresponding to the support center 45 is mitigated, and the tooth-root fatigue strength of the externally toothed gear 3B can be increased.

(Another Example of Externally Toothed Gear)

FIG. 6 is an explanatory view illustrating another example of the externally toothed gear 3B. An externally toothed gear 3C illustrated in this drawing has external teeth 37 that are applied with relieving at the center portion in the tooth trace direction thereof. Relieving portions 37a of the external teeth 37 are portions where no meshing of the external teeth with the internal teeth 23 is formed. Portions on both sides of the relieving portions 37a in the external teeth 37 are external tooth portions 37b and 37c to mesh with the internal teeth 23. The relieving portions 37a are applied with relieving so that a dimension in the tooth depth direction or a dimension in the tooth thickness direction is decreased with respect to the external teeth 37.

In the meshing portion 5B of the strain wave gearing 1B provided with the externally toothed gear 3C, a non-meshing region 6B is formed at the center portion in the tooth trace direction of the external teeth 37, no meshing of the external teeth with the internal teeth 23 being formed in the non-meshing region. Similar to the case in which the externally toothed gear 3B is employed, it is possible to mitigate stress concentration occurred in the center portion in the tooth trace direction of the tooth root of the external teeth 37, whereby increasing the tooth-root fatigue strength of the externally toothed gear 3C.

Embodiment 3

The above-mentioned embodiments are cases in which spur gears are employed as the internally toothed gear and the externally toothed gear. Helical gears can also be employed for the internally toothed gear and the externally toothed gear. A strain wave gearing according to Embodiment 3 of the present invention employs helical gears for an internally toothed gear and an externally toothed gear. FIG. 7(A) is an explanatory view illustrating a meshing portion between both gears of the strain wave gearing of Embodiment 3, in a state cut along the tooth trace direction. FIG. 7(B) is an explanatory view illustrating a cup-shaped externally toothed gear of the strain wave gearing.

The strain wave gearing 1D has the same basic configuration as that of the cup-type strain wave gearing 1 illustrated in FIG. 1. The strain wave gearing 1D of this example has an internally toothed gear 2D, which is a helical gear provided with internal teeth 24 having a tooth trace of a prescribed helix angle and a prescribed hand of helix. A cup-shaped externally toothed gear 3D of the strain wave gearing is also a helical gear provided with external teeth 38 having a tooth trace of the same helix angle and hand of helix as those of the internally toothed gear 2D. The external teeth 38 of this example are divided at the center portion in the tooth trace direction thereof. A wave generator 4D of the strain wave gearing is the same configuration as that of the above-mentioned wave generator 4.

The external teeth 38 of the externally toothed gear 3D are provided with a groove portion 38a where no external teeth are formed or where the external teeth are removed. On both sides of the groove portion 38a in the tooth trace direction, external tooth portions 38b and 38c are formed at constant pitches in the circumferential direction. The external tooth portions 38b and 38c on both sides are those having the same tooth trace direction. Therefore, the externally toothed gear 3D is a helical gear having a single tooth trace (namely, a helical gear provided with teeth having the same tooth trace). For example, the groove portion 38a is a cylindrical portion of a constant thickness. The groove portion 38a has a groove bottom surface defined by a circular outer circumferential surface, the outer diameter of which is the same as the root diameter of the external tooth portions 38b and 38c on both sides. A portion from the external tooth portion 38b to the groove bottom surface is defined by an inclined flat or curved surface, so that the tooth depth of the external tooth portion 38b is gradually decreased. Likewise, a portion from the other external tooth portion 38c to the groove bottom surface is defined by an inclined flat or curved surface, so that the tooth depth of the external tooth portion 38c is gradually decreased.

The groove portion 38a, in which no external teeth are formed, is a region having a predetermined width and including the support center 45 of the wave bearing 44 in the tooth trace direction. The support center 45 is located at the center of the effective tooth width of the external teeth 38, for example.

By the existence of the groove portion 38a of the external teeth 38, a non-meshing region 6D, in which no meshing of the external teeth with the internal teeth 24 is formed, is formed at the center portion in the tooth trace direction of a meshing portion 5D (which is a portion on the major axis of the elliptically-flexed externally toothed gear 3D). The non-meshing region 6D is a region having a predetermined width and including the support center 45 of the wave bearing 44 in the tooth trace direction. The stress concentration on the tooth root portion in the external teeth 38 corresponding to the support center 45 is mitigated, and the tooth-root fatigue strength of the externally toothed gear 3D can be increased.

The external teeth 38 of the externally toothed gear 3D may be provided with a portion where relieving is applied, instead of forming the groove 38a. It is also possible for the internal teeth 24 of the internally toothed gear 2D to be provided with a groove portion where no internal teeth are formed, or to be provided with a portion where relieving is applied instead of forming a groove portion.

Another Embodiments

The above-mentioned embodiments are in a case in which the present invention is applied to a strain wave gearing provided with a cup-shaped externally toothed gear. The present invention can also be applied in the same manner to a strain wave gearing provided with a silk-hat-shaped externally toothed gear and a strain wave gearing provided with a cylindrical externally toothed gear.

The invention claimed is:

1. A strain wave gearing comprising:
   a single rigid internally toothed gear;
   a single flexible externally toothed gear;
   a wave generator for flexing the externally toothed gear in a radial direction to form meshing portions thereof with the internally toothed gear in positions that are separated in a circumferential direction and for moving the meshing portions in the circumferential direction; and
   a non-meshing region formed in part of each of the meshing portions in a tooth trace direction,
   wherein the internally toothed gear and the externally toothed gear are spur gears, or helical gears having a single tooth trace;
   the wave generator has a wave bearing for supporting the externally toothed gear from a radially inner side thereof; and
   the non-meshing region is a region that has a width in the tooth trace direction so as to include a support center of the wave generator for supporting the externally toothed gear.

2. The strain wave gearing according to claim 1, wherein the non-meshing region is defined, in the tooth trace direction, by a portion where no internal teeth of the internally toothed gear are formed.

3. The strain wave gearing according to claim 2, wherein the externally toothed gear has:
   a rib formed in a section facing the portion where no internal teeth are formed; and
   external teeth formed on both sides of the rib in the tooth trace direction,
   the rib having a thickness larger than a root rim thickness of the external teeth.

4. The strain wave gearing according to claim 1, wherein the non-meshing region is defined, in the tooth trace direction, by a relieving portion where relieving is applied to internal teeth of the internally toothed gear so that a tooth-depth dimension or a tooth-thickness dimension thereof becomes small.

5. A strain wave gearing comprising:
   a rigid internally toothed gear;
   a flexible externally toothed gear;
   a wave generator for flexing the externally toothed gear in a radial direction to form meshing portions thereof with the internally toothed gear in positions that are separated in a circumferential direction and for moving the meshing portions in the circumferential direction; and
   a non-meshing region formed in part of each of the meshing portions in a tooth trace direction,
   wherein the internally toothed gear and the externally toothed gear are spur gears, or helical gears having a single tooth trace;
   the wave generator has a wave bearing for supporting the externally toothed gear from a radially inner side thereof; and
   the non-meshing region is a region that has a width in the tooth trace direction so as to include a support center of the wave generator for supporting the externally toothed gear;
   wherein the non-meshing portion is defined, in the tooth trace direction, by a portion where no external teeth are formed.

6. A strain wave gearing comprising:
   a rigid internally toothed gear;
   a flexible externally toothed gear;

a wave generator for flexing the externally toothed gear in a radial direction to form meshing portions thereof with the internally toothed gear in positions that are separated in a circumferential direction and for moving the meshing portions in the circumferential direction; and
a non-meshing region formed in part of each of the meshing portions in a tooth trace direction,
wherein the internally toothed gear and the externally toothed gear are spur gears, or helical gears having a single tooth trace;
the wave generator has a wave bearing for supporting the externally toothed gear from a radially inner side thereof; and
the non-meshing region is a region that has a width in the tooth trace direction so as to include a support center of the wave generator for supporting the externally toothed gear;
wherein the non-meshing region is defined, in the tooth trace direction, by a relieving portion where relieving is applied to external teeth of the externally toothed gear so that a tooth-depth dimension or a tooth-thickness dimension thereof becomes small.

* * * * *